Oct. 19, 1948.    C. OMAN    2,451,971
IMPULSE TRANSMITTER FOR METERING SYSTEMS
Filed May 1, 1945

WITNESSES:

INVENTOR
Carl Oman
BY
ATTORNEY

Patented Oct. 19, 1948

2,451,971

UNITED STATES PATENT OFFICE 2,451,971

IMPULSE TRANSMITTER FOR METERING SYSTEMS

Carl Oman, Cedar Grove, N. J., assignor to Westinghouse Electric Corporation, East Pittsburgh, Pa., a corporation of Pennsylvania Application May 1, 1945, Serial No. 591,297

2 Claims. (Cl. 177—351)

My invention relates, generally, to metering systems and has reference, in particular, to remote metering systems.

Generally stated, it is an object of my invention to provide an impulse transmitter for remote metering that is simple and inexpensive to manufacture and is easy to operate.

More specifically, it is an object of my invention to provide an electronic transmitter for producing impulses at a rate dependent upon the value of a quantity which is to be measured.

It is also an object of my invention to provide a radiant energy pick-up for producing impulses of electrical energy at a rate dependent upon the value of a quantity which is to be measured.

Another object of my invention is to provide for interrupting a beam of light so as to produce impulses of electrical energy at rates above and below a predetermined base rate, dependent on the value of a quantity which is to be measured.

Yet another object of my invention is to provide for producing telemetering impulses at rates greatly in excess of those which are practical with contact making and breaking devices of the usual description.

Other objects will in part be obvious, and will in part be described hereinafter.

In accordance with my invention, a light-responsive valve is used in conjunction with a source of light for controlling the conductivity of an electric discharge valve. The conductivity of the discharge valve is varied by means of associated main and base rate shutters. The base rate shutter is provided with a plurality of spaced openings and is rotated at a substantially constant speed to move the openings across the path of the light between the source and the light-responsive device to periodically render the discharge device conductive at a base rate when the main shutter is still. Variation of the frequency of the periods of conductivity above and below the base rate is provided by operating the main shutter which has a plurality of similar spaced openings adjacent the periphery and passing through the path of the light between the source and the light-sensitive device. The main shutter is driven by a suitable metering device so as to produce impulses at an overall rate which is dependent upon the value of the quantity being metered.

For a more complete understanding of the nature and scope of my invention, reference may be made to the following detailed description, which may be studied in connection with the accompanying drawing, in which.

Figure 1:
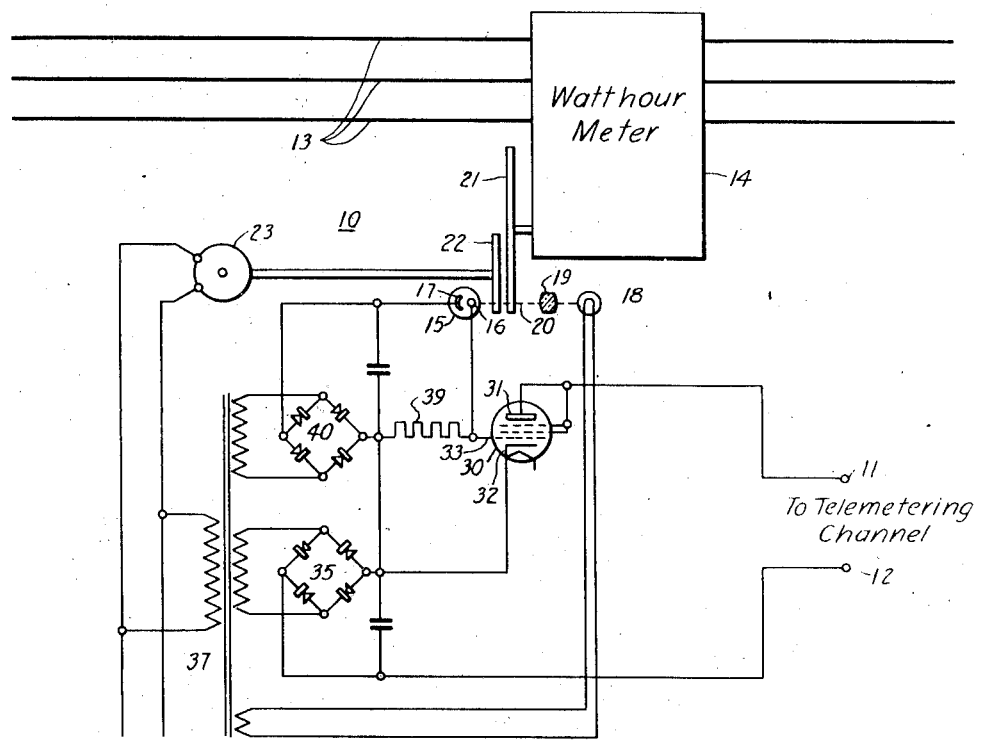
Figure 1 is a diagrammatic view of an impulse transmitter embodying the invention in one of its forms.

Referring to Fig. 1, the reference numeral 10 may denote, generally, an impulse transmitter for transmitting impulses of electrical energy to a remote point over a telemetering channel connected to terminals 11 and 12, for indicating the value of a quantity such as the rate of flow of power in a power system represented by the power conductors 13, as measured by means such as the watthour meter 14.

Figure 3:
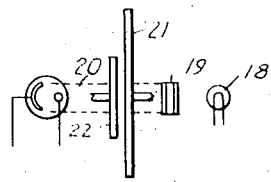
Fig. 3 is a plan view of a portion of the system showing the arrangement of the optical system.

In order to provide for producing impulses of electrical energy at a rate dependent upon the rate of flow of power in the conductors 13, a radiant energy or light-sensitive valve 15, having an anode 16 and cathode 17, may be utilized in conjunction with a suitable light source 18. A cylindrical lens 19, as shown in Figs. 1 and 3, may be utilized for producing a relatively wide and thin beam of light 20 indicated by dotted lines, which may be interrupted periodically to produce impulses of electrical energy.

Figure 2:
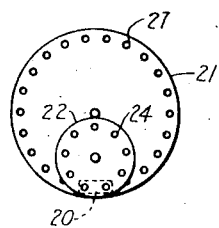
Fig. 2 is a front elevational view of the main and base rate shutters showing the arrangement of the openings.

In order to provide for producing impulses at rates which distinguish between positive and negative directions of flow, interruption of the light beam 20 may be effected by means of a main shutter 21 and a base rate shutter 22. The base rate shutter 22 may comprise a disc which is rotated at a constant speed by means of a synchronous motor 23 to provide impulses at a predetermined base rate when there is no power flow. As shown in Figs. 1 to 3, the base rate shutter disc 22 may be positioned so that the periphery intercepts the light beam. A plurality of equally spaced openings 24 may be provided adjacent the periphery of the disc, and which may be so spaced that two of the openings may be positioned in the path of the light beam 20 projected on the cathode of the source 18 at one time.

Variation of the frequency of the impulses from the base rate may be produced by means of the main shutter disc 21, which may be rotatably mounted and provided with a plurality of similarly spaced openings 27. The main shutter disc 21 may be driven by the watthour meter 14 and may be so positioned that the openings 27 may be aligned with the openings 24 of the base rate shutter disc in the path of the light beam.

The openings in the main and base rate shutters may be equally spaced so that two openings in each shutter may be alined to transmit light from the source to the valve 15. The spacing of the openings may be such that the light and dark periods are approximately equal. Openings having a diameter approximately ⅓ of the distance between centers have proven entirely satisfactory in this respect. A diameter of ½ the distance between centers may prevent the light from being cut off. The light sensitive valve should have a window or active area at least equal to the distance between centers of the openings, or slightly greater.

In order to utilize the variations in light intensity on the light-sensitive device 15 for producing usable impulses of electrical energy, means such as the electric valve 30 having an anode 31, a cathode 32, and a control electrode 33 may be provided. The valve 30 may be connected with its anode and cathode in series circuit relation with the terminals 11 and 12 and a suitable source of electrical energy, such as the rectifier bridge circuit 35, which may be energized from a source of alternating current by means of a transformer 37. The valve 30 may be so connected that the control electrode 33 has little or no negative bias and the valve is normally conductive to supply electrical energy to the telemetering channel. By connecting the light-sensitive valve 15 in series circuit relation with a control electrode bias resistor 39 and a source of electrical energy such as the rectifier bridge circuit 40, sufficient negative bias may be applied to the control electrode 33 to render the valve 30 nonconductive whenever a pulse of light falls upon the cathode 17 of the light-sensitive device 15.

In operation, the main shutter disc 21 stands still at zero load condition, while the base rate shutter disc 22 rotates at a constant speed and chops the light beam at the base frequency. Accordingly, the light-sensitive device 15 is periodically rendered conductive at the base frequency so that the conductivity of the valve 30 is likewise interrupted at the base frequency. Since the spacing of the openings in the shutter discs relative to the diameter of the openings is such as to cause the light and dark periods of the light-sensitive device 15 to be approximately equal, the resultant output of the anode-cathode circuit of the valve 30 is approximately a square wave of the base rate frequency, and may be used for operating a receiver at a remote location to indicate a zero load condition.

When power flows in the conductors 13, the watthour meter 14 operates and the main shutter disc 21 is rotated to cause the light beam to be interrupted or chopped at a rate higher or lower than the base rate, depending upon the direction of power flow. In one embodiment, with base rate and main shutter discs of the proportions illustrated, the base rate was 1500 impulses per minute, with the full scale negative power indication being 500 impulses per minute, while the full scale positive power indication was 2500 impulses per minute. For good performance the disc speeds of the watthour meter are preferably kept within a relatively narrow range. Speeds of from 0 to 25 R. P. M. from zero load to full load have proven highly satisfactory.

From the above description and the acompanying drawings, it will be apparent that an impulse transmitter embodying the features of my invention is both simple and inexpensive to manufacture and is easy to operate. While this transmitter may be readily used with numerous other types of impulse receivers it is particularly adapted for use with an electronic receiver of the type described and claimed in my copending application, Serial No. 591,298. When thus used a metering circuit with an exceedingly low response time results, which is particularly adapted to load control. A response time on the order of one second is readily obtained. Since there are no moving contacts, maintenance of the transmitter is exceedingly low, and because of its relatively simple construction, repairs may be easily made. Impulses may be produced at rates which are two to five times faster than those of previous schemes. In addition, the time of response is about five times faster than that of the usual telemetering equipment.

Since certain changes may be made in the above-described construction, and different embodiments of the invention may be made without departing from the spirit and scope thereof, it is intended that all the matter contained in the above description and shown in the accompanying drawing shall be considered as illustrative and not in a limiting sense.

I claim as my invention:

1. A base rate impulse transmitter comprising, a light-sensitive device and a light source, a main shutter disc rotatably positioned between the light source and the light-sensitive device and arranged for rotation by a meter device, said disc having a plurality of evenly spaced openings adjacent the periphery in the path of the light from the source, means including a cylindrical lens between the light source and the disc for producing a beam of light spanning a pair of adjacent openings, a base rate shutter disc of less diameter than the main disc having a plurality of similarly spaced openings, said base rate shutter disc being so rotatably mounted eccentrically of the main shutter disc as to overlap therewith and arranged to permit alignment of a pair of adjacent openings of each shutter disc in the path of the beam of light, means for rotating the base rate disc at a fixed rate to provide a predetermined number of impulses of light when the main shutter disc is still, and an electric discharge valve controlled by the light-sensitive device for producing substantially square wave impulses at different rates above and below the base rate in response to rotation of the main and base rate shutter discs.

2. The combination in a telemetering impulse transmitter, of light-sensitive means including a light-sensitive valve and an associated light source, a main shutter disc having a plurality of evenly spaced openings adjacent the periphery, said disc being rotatably mounted with the peripheral portion having the holes intercepting the light between the source and the light-sensitive vavle and driven by a meter responsive to the amount and direction of flow of electrical power in a circuit to be metered, an optical system having a cylindrical lens for condensing the light from the source into a relatively thin and wide beam capable of spanning two of said openings, an auxiliary base rate shutter disc rotatably positioned in eccentric relation to the main shutter disc so as to overlap the main shutter disc in internal tangential relation and arranged to be rotated at a substantially constant speed, said base rate shutter being of about one-half the diameter of the main disc and having peripheral openings spaced substantially the same distance as the openings in the main disc and being disposed relative to the main shutter disc so as to permit alignment of a pair of openings in the base rate shutter with a pair in the main shutter disc in the path of said beam, and an amplifier including an electric discharge valve conductive when the light-sensitive valve is dark and having a control circuit controlled by the light-sensitive valve for interrupting the flow of electrical energy when light strikes the light-sensitive valve.

CARL OMAN.

REFERENCES CITED

The following references are of record in the file of this patent:

UNITED STATES PATENTS

| Number | Name | Date |
| --- | --- | --- |
| 1,672,671 | Young | June 5, 1928 |
| 2,277,285 | Woodling | Mar. 24, 1942 |

FOREIGN PATENTS

| Number | Country | Date |
| --- | --- | --- |
| 46,165 | France | Dec. 23, 1935 |
| 462,778 | Great Britain | Mar. 16, 1937 |